US006931919B2

(12) United States Patent
Weldon

(10) Patent No.: US 6,931,919 B2
(45) Date of Patent: Aug. 23, 2005

(54) DIAGNOSTIC APPARATUS AND METHOD FOR AN EVAPORATIVE CONTROL SYSTEM INCLUDING AN INTEGRATED PRESSURE MANAGEMENT APPARATUS

(75) Inventor: Craig Weldon, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 514 days.

(21) Appl. No.: 09/893,530

(22) Filed: Jun. 29, 2001

(65) Prior Publication Data

US 2003/0000289 A1 Jan. 2, 2003

(51) Int. Cl.[7] .............................................. G01M 15/00
(52) U.S. Cl. ..................................................... 73/118.1
(58) Field of Search .......................... 73/49.7, 112, 113, 73/116, 117.2, 117.3, 118.1

(56) References Cited

U.S. PATENT DOCUMENTS

| | | | | |
|---|---|---|---|---|
| 3,110,502 | A | 11/1963 | Pagano | 277/189 |
| 3,190,322 | A | 6/1965 | Brown | 141/387 |
| 3,413,840 | A | 12/1968 | Basile et al. | 73/40 |
| 3,516,279 | A | 6/1970 | Maziarka | 73/4 |
| 3,586,016 | A | 6/1971 | Meyn | 137/39 |

(Continued)

OTHER PUBLICATIONS

U.S. Appl. No. 09/893,508, Craig Weldon, filed Jun. 29, 2001.
U.S. Appl. No. 09/566,138, Paul D. Perry, filed May 5, 2000.
U.S. Appl. No. 09/566,137, Paul D. Perry, filed May 5, 2000.
U.S. Appl. No. 09/566,136, Paul D. Perry et al., filed May 5, 2000.
U.S. Appl. No. 09/566,135, Paul D. Perry, filed May 5, 2000.
U.S. Appl. No. 09/566,133, Paul D. Perry, filed May 5, 2000.
U.S. Appl. No. 09/565,028, Paul D. Perry et al., filed May 5, 2000.
U.S. Appl. No. 09/543,748, Paul D. Perry, filed Apr. 5, 2000.
U.S. Appl. No. 09/543,747, Paul D. Perry et al., filed Apr. 5, 2000.
U.S. Appl. No. 09/543,742, Paul D. Perry, filed Apr. 5, 2000.
U.S. Appl. No. 09/543,741, Paul D. Perry, filed Apr. 5, 2000.
U.S. Appl. No. 09/543,740, Paul D. Perry et al., filed Mar. 31, 2000.
U.S. Appl. No. 09/542,052, Paul D. Perry et al., filed Mar. 31, 2000.
U.S. Appl. No. 09/540,491, Paul D. Perry, filed Mar. 31, 2000.
U.S. Appl. No. 09/275,250, John E. Cook et al., filed Mar. 24, 1999.
U.S. Appl. No. 09/165,772, John E. Cook, et al., filed Oct. 2, 1998.

*Primary Examiner*—Eric S. McCall

(57) ABSTRACT

A diagnostic appartus and method for a fuel system that supplies fuel to an internal combustion engine. The fuel system includes a fuel tank that has a headspace and a filler occluded by a removable cap, a charcoal canister in fluid communication with the headspace, and an integrated pressure management apparatus. The integrated pressure management apparatus has a pressure operable device and a switch that signals displacement of the pressure operable device in response to negative pressure at a first pressure level in the charcoal canister. The diagnostic apparatus comprises a pressure source, a first fitting adapted to be occluded by the removable cap, a second fitting adapted to sealingly engage the filler, an orifice in fluid communication with the pressure source, with the first fitting, and with the second fitting, and a first valve controlling the fluid communication with the orifice. The first fitting is in fluid communication with the pressure source, and the second fitting is in fluid communication with the pressure source and with the first fitting.

18 Claims, 2 Drawing Sheets

U.S. PATENT DOCUMENTS 3,640,501 A 2/1972 Walton ........................ 251/332
3,720,090 A 3/1973 Halpert et al. ................... 73/4
3,802,267 A 4/1974 Lofink ......................... 73/279
3,841,344 A 10/1974 Slack .......................... 137/88
3,861,646 A 1/1975 Douglas ..................... 251/356
3,927,553 A 12/1975 Frantz ............................ 73/4
4,009,985 A 3/1977 Hirt .............................. 431/5
4,136,854 A 1/1979 Ehmig et al. .............. 251/333
4,164,168 A 8/1979 Tateoka ....................... 91/376
4,166,485 A 9/1979 Wokas ......................... 141/52
4,215,846 A 8/1980 Ishizuka et al. ............ 251/298
4,240,467 A 12/1980 Blatt et al. ............. 137/625.66
4,244,210 A * 1/1981 Prohaska et al. ............. 73/113
4,244,554 A 1/1981 DiMauro et al. .......... 251/61.1
4,354,383 A 10/1982 Härtel ......................... 73/290
4,368,366 A 1/1983 Kitamura et al. ............. 200/83
4,474,208 A 10/1984 Looney ................. 137/516.29
4,494,571 A 1/1985 Seegers et al. ........ 137/596.16
4,518,329 A 5/1985 Weaver ...................... 417/566
4,561,297 A 12/1985 Holland ....................... 73/119
4,616,114 A 10/1986 Strasser ....................... 200/83
4,717,117 A 1/1988 Cook ........................ 251/61.1
4,766,557 A 8/1988 Twerdochlib ................ 702/51
4,766,927 A 8/1988 Conatser ..................... 137/315
4,852,054 A 7/1989 Mastandrea .................. 702/51
4,901,559 A 2/1990 Grabner ..................... 73/64.45
4,905,505 A 3/1990 Reed ......................... 73/64.46
5,036,823 A 8/1991 MacKinnon ................ 123/520
5,069,188 A 12/1991 Cook ......................... 123/520
5,090,234 A 2/1992 Maresca, Jr. et al. ........ 73/49.1
5,096,029 A 3/1992 Bauer et al. ................ 188/300
5,101,710 A 4/1992 Baucom ..................... 454/238
5,239,858 A * 8/1993 Rogers et al. ............... 73/40.7
5,253,629 A 10/1993 Fornuto et al. ............. 123/519
5,259,424 A 11/1993 Miller et al. .................... 141/4
5,263,462 A 11/1993 Reddy ........................ 123/520
5,273,071 A 12/1993 Oberrecht .............. 137/614.06
5,327,934 A 7/1994 Thompson .................. 137/588
5,337,262 A 8/1994 Luthi et al. ................. 364/580
5,369,984 A * 12/1994 Rogers et al. ............... 73/49.2
5,372,032 A 12/1994 Filippi et al. ................ 73/40.5
5,375,455 A 12/1994 Maresca, Jr. et al. ........ 73/40.5
5,388,613 A 2/1995 Krüger .................. 137/625.34
5,390,643 A 2/1995 Sekine ....................... 123/514
5,390,645 A 2/1995 Cook et al. ................ 123/520
5,415,033 A 5/1995 Maresca, Jr. et al. ........ 73/40.5
5,425,266 A * 6/1995 Fournier ..................... 73/49.7
5,437,257 A 8/1995 Giacomazzi et al. ........ 123/520
5,448,980 A 9/1995 Kawamura et al. ......... 123/520
5,474,050 A 12/1995 Cook et al. ................. 123/520
5,507,176 A 4/1996 Kammeraad et al. ........ 73/49.2
5,524,662 A 6/1996 Benjey et al. ................ 137/43
5,564,306 A 10/1996 Miller ......................... 73/861
5,579,742 A 12/1996 Yamazaki et al. .......... 123/520
5,584,271 A 12/1996 Sakata ..................... 123/188.6
5,603,349 A 2/1997 Harris ........................ 137/588
5,614,665 A 3/1997 Curran et al. .............. 73/118.1
5,635,630 A 6/1997 Dawson et al. .............. 73/40.5
5,644,072 A 7/1997 Chirco et al. ................ 73/49.2
5,671,718 A 9/1997 Curran et al. ............... 123/520
5,681,151 A 10/1997 Wood ......................... 417/307
5,687,633 A 11/1997 Eady ............................. 92/97
5,743,169 A 4/1998 Yamada ....................... 92/100
5,826,566 A 10/1998 Isobe et al. ................. 123/520
5,884,609 A 3/1999 Kawamoto et al. ......... 123/520
5,893,389 A 4/1999 Cunningham .......... 137/516.27
5,894,784 A 4/1999 Bobbitt, III et al. .......... 92/100
5,911,209 A 6/1999 Kouda et al. ............... 123/520
5,979,869 A 11/1999 Hiddessen .................. 251/285
6,003,499 A 12/1999 Devall et al. ............... 123/520
6,073,487 A 6/2000 Dawson ..................... 73/118.1
6,089,081 A 7/2000 Cook et al. ................ 73/118.1
6,142,062 A 11/2000 Streitman ...................... 92/99
6,145,430 A 11/2000 Able et al. ..................... 92/93
6,168,168 B1 1/2001 Brown ....................... 277/637
6,176,118 B1 * 1/2001 Kidokoro et al. .............. 73/40
6,202,688 B1 3/2001 Khadim ................. 137/599.08
6,203,022 B1 3/2001 Struschka et al. .......... 277/572
6,327,898 B1 * 12/2001 Harris ........................ 73/49.2
6,328,021 B1 12/2001 Perry et al. ................. 123/518

* cited by examiner

DIAGNOSTIC APPARATUS AND METHOD FOR AN EVAPORATIVE CONTROL SYSTEM INCLUDING AN INTEGRATED PRESSURE MANAGEMENT APPARATUS

FIELD OF THE INVENTION

This disclosure generally relates to an apparatus and method for diagnosing a fuel system of an internal combustion engine. In particular, this disclosure is directed to a diagnostic apparatus and method for servicing a fuel system including an integrated pressure management apparatus (IPMA).

BACKGROUND OF THE INVENTION

A conventional evaporative control system collects in a charcoal canister the fuel vapor that escapes from a fuel tank. If there is a leak in the fuel tank, canister, or any other component of the evaporative control system, some fuel vapor could escape through the leak into the atmosphere instead of being collected in the canister. Thus, it is desirable to detect leaks.

Leak detection for an evaporative control system is one of several functions that are performed by the IPMA that is disclosed in U.S. patent application Ser. No. 09/542,052, filed Mar. 31, 2000, and which is incorporated by reference herein in its entirety. Briefly, a switch can be activated indicating displacement of a pressure operable device in response to a negative pressure level in a charcoal canister. A properly performing, i.e., sealed, evaporative system should at least maintain the negative pressure level. However, if the evaporative system has a large enough leak, the evaporative system will not maintain switch activation. In an extreme case of a gross leak, no appreciable negative pressure occurs in the evaporative system occurs and the switch activation does not occur. Servicing this IPMA can include verifying switch activity and evaporation system integrity.

It is believed that there is a need to provide an IPMA service tool that can evaluate evaporative control system integrity and verify IPMA switch activity.

SUMMARY OF THE INVENTION

The present invention provides a diagnostic appartus for a fuel system that supplies fuel to an internal combustion engine. The fuel system includes a fuel tank that has a headspace and a filler occluded by a removable cap, a charcoal canister in fluid communication with the headspace, and an integrated pressure management apparatus. The integrated pressure management apparatus has a pressure operable device and a switch that signals displacement of the pressure operable device in response to negative pressure at a first pressure level in the charcoal canister. The diagnostic apparatus comprises a pressure source, a first fitting adapted to be occluded by the removable cap, a second fitting adapted to sealingly engage the filler, an orifice in fluid communication with the pressure source, with the first fitting, and with the second fitting, and a first valve controlling the fluid communication with the orifice. The first fitting is in fluid communication with the pressure source, and the second fitting is in fluid communication with the pressure source and with the first fitting.

The present invention also provides a method of method of diagnosing a fuel system that supplies fuel to an internal combustion engine. The fuel system includes a fuel tank that has a headspace and a filler occluded by a removable cap, a charcoal canister in fluid communication with the headspace, and an integrated pressure management apparatus. The integrated pressure management apparatus has a pressure operable device and a switch that provides a signal indicating displacement of the pressure operable device in response to negative pressure at a first pressure level in the charcoal canister. The method comprises installing a diagnostic apparatus between the filler and the cap, closing a valve that controls fluid communication with an orifice, operating a pressure source to draw a vacuum relative to ambient pressure, and detecting the signal provided by the switch. The diagnostic appratus includes the pressure source, the orifice that is in fluid communication with the pressure source, with the filler, and with the cap, and the valve.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used herein, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Figure 1:
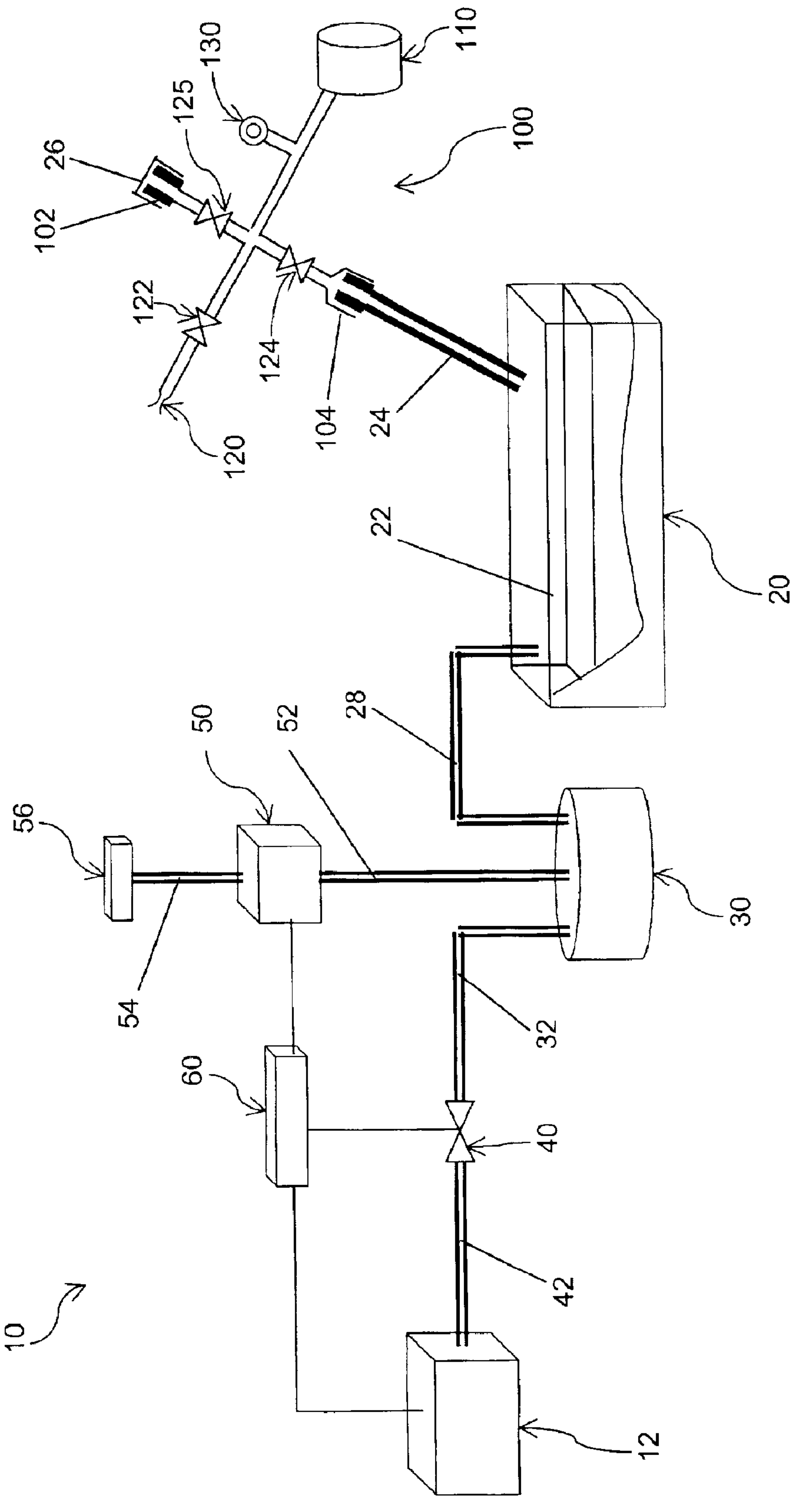
FIG. 1 is a schematic illustration of an IPMA service tool connected to an evaporative control system.

Referring to FIG. 1, an evaporative control system 10 for an internal combustion engine 12 includes a fuel tank 20, a charcoal canister 30, a purge valve 40, and an IPMA 50.

The fuel tank 20 contains volatile liquid fuel and fuel vapors in a headspace 22 above the surface of the liquid fuel. A filler 24 that is normally occluded by a cap 26 provides access to the fuel tank 20 during refueling. A first conduit 28 provides fluid communication between the headspace 22 and the charcoal canister 30.

In a conventional manner, the charcoal canister 30 collects fuel vapors from the beadspace 22. A second conduit 32 provides fluid communication from the charcoal canister 30 to the purge valve 40, and a third conduit 42 provides fluid communication from the purge valve 40 to an intake manifold (not shown) of the internal combustion engine 12.

The IPMA 50 is in fluid communication with the charcoal canister via a fourth conduit 52. The IPMA 50 can perform a plurality of functions including signaling that a predetermined first pressure (vacuum) level exists in the charcoal canister 30, relieving pressure at a value below the first pressure level, relieving pressure above a second pressure level, and controllably connecting, via a fifth conduit 54 in fluid communication with a filter 56, the charcoal canister 30 to ambient atmospheric pressure.

The engine control unit 60 can provide output signals to the internal combustion engine 12 and to the purge valve 40. These output signals are at least in part based on input signals from the IPMA 50 and other sensors (not shown).

In the course of cooling that is experienced by the fuel, e.g., after the internal combustion engine 12 is turned off, a vacuum is allowed to develop in the evaporative control system 10 due to its isolation from the atmosphere by the function of the IPMA 50. The existence of a vacuum at the first pressure level indicates that the integrity of the evaporative control system 10 is satisfactory. Accordingly, the IPMA 50 provides to the engine control unit 60 an input signal that indicates the integrity of the evaporative control system 10, i.e., that there are no leaks. The IPMA 50 can also relieve pressure below the first pressure level to protect the evaporative control system 10, e.g., to prevent the fuel tank 20 from collapsing due to excess vacuum.

Immediately after the internal combustion engine 12 is turned off, the IPMA 50 can perform "blow off," i.e., relieving excess pressure due to fuel vaporization, and thereby facilitate subsequent vacuum generation that occurs during cooling. During blow off, air within the evaporative system 10 is released while fuel molecules are retained. Similarly, in the course of refueling the fuel tank 20, relieving excess pressure allows air to exit the fuel tank 20 at a high rate of flow.

While the internal combustion engine 12 is turned on, the IPMA 50 can connect the canister 30 to ambient air, thereby facilitating purge flow from the charcoal canister 30, through the purge valve 40, to the internal combustion engine 12. While the internal combustion engine 12 is turned off, the IPMA 50 can provide to the engine control unit 60 the input signal indicating the vacuum level that is generated during cooling.

Figure 2:
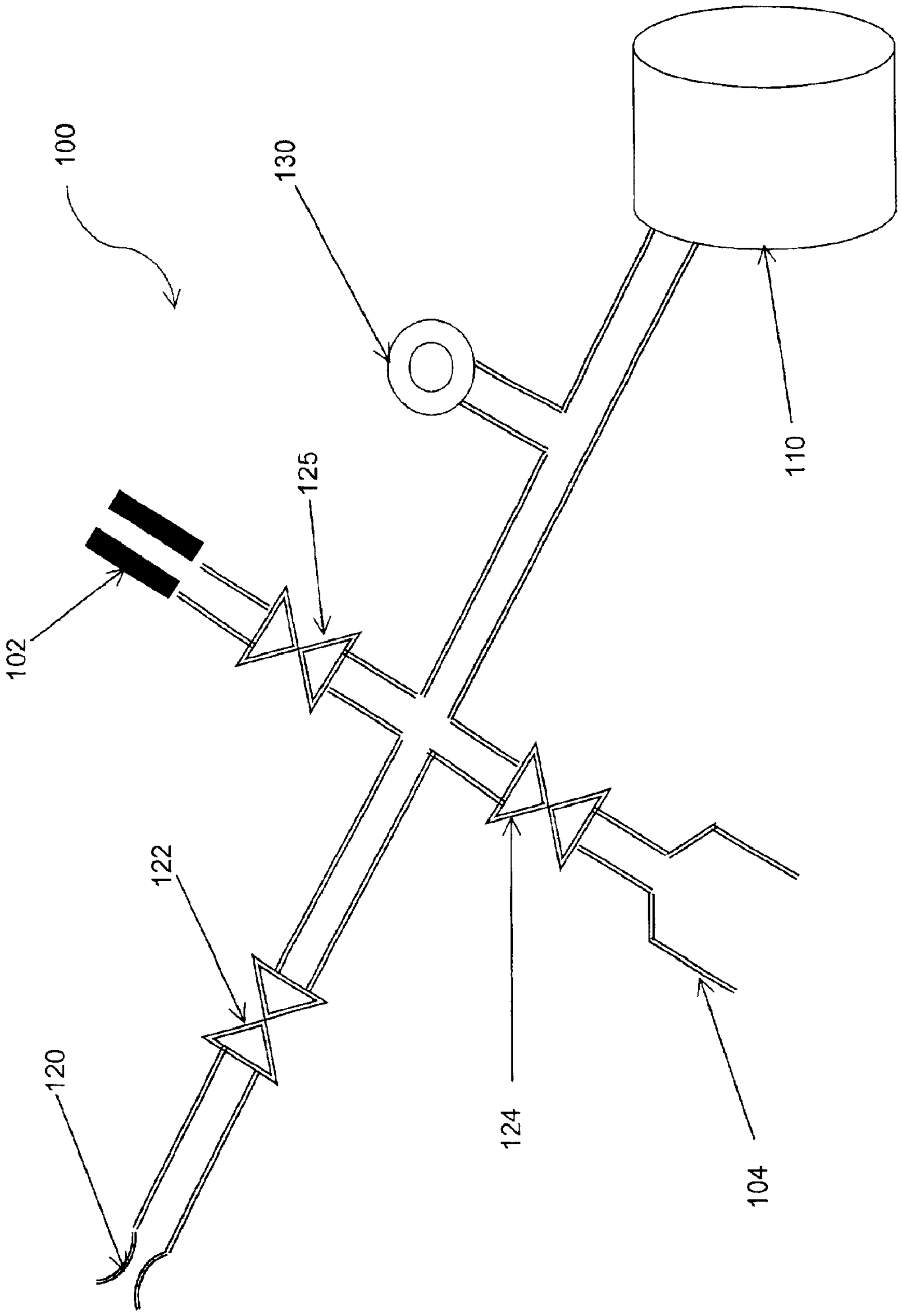
FIG. 2 is a schematic illustration of the IPMA service tool shown in FIG. 1.

Referring additionally to FIG. 2, a diagnostic apparatus 100 for servicing the IPMA 50 includes a first fitting 102 that can be occluded by the removable cap 26 and a second fitting 104 that sealingly engages the filler 24. According to one embodiment, the first fitting 102 can be a threaded female member sized to cooperatively receive the removable cap 26, and the second fitting 104 can be a threaded male member sized to be cooperatively received by the filler 24. Thus, the diagnostic apparatus 100 incorporates testing for leakage of the removable cap 26.

In fluid communication with the first and second fittings 102,104 is a pressure source 110 and a leak down orifice 120. Preferably, the pressure source 110 creates a vacuum, i.e., a negative pressure relative to ambient. A first valve 122 controls fluid communication between the pressure source 110 and the leak down orifice 120. After the pressure source 110 establishes in the evaporative control system 10 a pressure level that is at or below the predetermined first pressure level, the first valve 122 can be opened and the vacuum in the evaporative control system 10 can be bled down via the leak down orifice 120. The pressure source 110 can include a manually operated hand pump, an electromechanical pump, or some other equivalent device for drawing a vacuum.

A second valve 124 can control fluid communication between the pressure source 110 and the second fitting 104. Opening the second valve 124 enables the diagnostic apparatus 100 to test the evaporative control system 10. Closing the second valve 124 enables the diagnostic apparatus 100 to separately test the removable cap 26, i.e., by isolating the removable cap 26 from the remainder of the evaporative control system 10.

A third valve 125 can control fluid communication between the pressure source 110 and the first fitting 102. Closing the third valve 125 enables the diagnostic apparatus 100 to test the evaporative control system 10. Opening the third valve 125 enables the diagnostic apparatus 100 to test the evaporative control system 10 including the removable cap 26.

A pressure gauge 130 on the suction side of the pressure source 110 can measure the pressure level drawn by the pressure source 110. The pressure gauge 130 can be a low-pressure vacuum gauge, a pressure transducer, or some other equivalent device for measuring a range of pressures that preferably exceeds the operational range of the IPMA 50. As an example, the pressure gauge 130 may measure pressures that range between approximately one inch of water above ambient pressure and two inches of water below ambient pressure.

A method of diagnosing the evaporative control system 10 and servicing the IPMA 50 will now be described. First, the cap 26 is removed from the filler 24 in order to open the evaporative control system 10. Fluid communication between the evaporative control system 10 and the diagnostic apparatus 100 is established by matingly engaging the removed cap 26 with the first fitting 102, and by matingly engaging the second fitting 104 with the filler 24.

To diagnose the integrity of the removable cap 26 separate from the rest of the evaporative control system 10, the first and second valves 122,124 are closed to isolate the pressure source 110, the first fitting 102, the removable cap 26, and the pressure gauge 130. The pressure source 110 is operated to draw a vacuum at or below, as indicated by the pressure gauge 130, the predetermined first pressure level. Operation of the pressure source 110 is discontinued and the pressure gauge 130 is monitored to detect changes in the pressure drawn by the pressure source 110. The inability to establish a vacuum at the predetermined first level, or a rising pressure level, as indicated by the pressure gauge 130, are indicative of a flawed removable cap 26.

To diagnose the integrity of the entire evaporative control system 10, including the removable cap 26, the first valve 122 is closed, the second valve 124 is opened, and the third valve 125 is opened. The pressure source 110 is then operated to draw a vacuum at or below, as indicated by the pressure gauge 130, the predetermined first pressure level. The inability to establish a vacuum at the predetermined first level is indicative of a gross leak in the evaporative control system 10. A rising pressure level, as indicated by the pressure gauge 130, is indicative of a leak somewhere in the evaporative control system 10. The loss of vacuum (magnitude rate) is a rough measure of the leak size. However, there are other influences that can cause a pressure/vacuum change in an otherwise sealed evaporative control system 10. For example, vacuum decay can be caused by the temperature of the evaporative control system 10 relative to the ambient temperature, barometric pressure changes, agitation of the vehicle/fuel creating accelerated evaporation, refueling of the fuel tank 20, etc.

The diagnostic apparatus 100 can also be used to service the IPMA 50, e.g., for verifying switch activity. To cycle the IPMA switch, the pressure source 110 is operated to draw in the evaporative control system 10 a vacuum at which activation of the IPMA switch occurs. Switch activity can be monitored with an electrical meter, e.g., a voltmeter, connected to the switch, or with an output signal from the engine control unit 60. The pressure level at which the switch is activated, i.e., the first pressure level, can be measured by the pressure gauge 130.

The activity of the IPMA switch can continue to be monitored as the first valve 122 is opened to bleed-off through the leak down orifice 120 the vacuum in the evaporative control system 10.

The diagnostic apparatus 100 can also be used to verify other functions of the IPMA 50. Specifically, the diagnostic apparatus 100 can be used to negatively or positively pressurize the evaporative control system 10. Drawing an excessive negative pressure, i.e., a pressure below that required for the IPMA 50 to perform leak detection, can verify the vacuum relief function of the IPMA 50. And creating a positive pressure in the evaporative control system 10 can verify the blow-off function of the evaporative control system 10. Moreover, such a positive pressure test could be used in connection with hydrocarbon sniffer technology and methodology to aid in locating a leak in the evaporative control system 10.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A diagnostic apparatus for a fuel system supplying fuel to an internal combustion engine, the fuel system including a fuel tank having a headspace and a filler occluded by a removable cap, a charcoal canister in fluid communication with the headspace, and an integrated pressure management apparatus having a pressure operable device and a switch signaling displacement of the pressure operable device in response to negative pressure at a first pressure level in the charcoal canister, the diagnostic apparatus comprising:

a pressure source to operate the pressure operable device and switch;

a first fitting adapted to be occluded by the removable cap, the first fitting being in fluid communication with the pressure source;

a second fitting adapted to sealingly engage the filler, the second fitting being in fluid communication with the pressure source and with the first fitting;

an orifice being in fluid communication with the pressure source, with the first fitting, and with the second fitting; and a first valve controlling the fluid communication with the orifice.

2. The diagnostic apparatus according to claim 1, further comprising:

a pressure guage in fluid communication with the pressure source.

3. The diagnostic apparatus according to claim 2, wherein the pressure guage measures a range of pressures that exceeds an operational range of the integrated pressure management apparatus.

4. The diagnostic apparatus according to claim 3, wherein the pressure guage measures a range of pressures between one inch of water above ambient pressure and two inches of water below ambient pressure.

5. The diagnostic apparatus according to claim 1, further comprising:

a second valve controlling the fluid communication with the second fitting.

6. The diagnostic apparatus according to claim 1, wherein the first fitting comprises a first one of a male member and a female member, the second fitting comprises a second one of the male and female members, and the male and female members are sized for mating engagement with respect to one another.

7. The diagnostic apparatus according to claim 1, wherein the pressure source comprises one of a manually operated pump and a electromechanical pump.

8. A method of diagnosing a fuel system supplying fuel to an internal combustion engine, the fuel system including a fuel tank having a headspace and a filler occluded by a removable cap, a charcoal canister in fluid communication with the headspace, and an integrated pressure management apparatus having a pressure operable device and a switch providing a signal indicating displacement of the pressure operable device in response to negative pressure at a predetermined pressure level in the charcoal canister, the method comprising:

installing a diagnostic apparatus between the filler and the cap, the diagnostic apparatus including a pressure source;

operating the pressure source to draw a vacuum relative to ambient pressure; and detecting the signal provided by the switch.

9. The method according to claim 8, further comprising:

measuring the vacuum relative to ambient pressure.

10. The method according to claim 9, wherein the measuring the vacuum includes determining a measured pressure level at which the detecting the signal occurs.

11. The method according to claim 10, further comprising: comparing the measured pressure level and the predetermined pressure level.

12. The method according to claim 9, wherein the measuring the vacuum includes detecting leaks in the fuel system.

13. The method according to claim 9, further comprising:

preventing fluid communication between the pressure source and the filler;

wherein the measuring the vacuum detects leaks in the cap.

14. The method according to claim 9, further comprising:

bleeding off the vacuum relative to ambient pressure;

wherein the detecting comprises determining a change in the signal provided by the switch.

15. The method according to claim 8, wherein the operating the pressure source comprises at least one of operating a manual pump and operating an electromechanical pump.

16. The method according to claim 8, further comprising:

operating the pressure source to draw a negative pressure in excess of the vacuum relative to ambient pressure; and verifying negative pressure relief by the integrated pressure management apparatus.

17. The method according to claim 8, further comprising:

operating the pressure source to create a positive pressure relative to ambient pressure; and verifying positive pressure relief by the the integrated pressure management apparatus.

18. The method according to claim 8, wherein the detecting the signal comprises at least one of connecting an electric meter to the switch and receiving an output signal from a computer connected to the internal combustion engine.

* * * * *